(12) United States Patent
Souissi et al.

(10) Patent No.: US 7,944,901 B2
(45) Date of Patent: *May 17, 2011

(54) SYSTEMS AND METHODS FOR AUTOMATIC CONNECTION WITH A WIRELESS NETWORK

(75) Inventors: Slim Souissi, San Diego, CA (US); John Wu, San Diego, CA (US); Brad Kim, San Diego, CA (US); Anand Gore, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,225

(22) Filed: Apr. 16, 2010

(65) Prior Publication Data

US 2010/0290444 A1    Nov. 18, 2010

Related U.S. Application Data

(63) Continuation of application No. 12/537,970, filed on Aug. 7, 2009.

(60) Provisional application No. 61/178,926, filed on May 15, 2009.

(51) Int. Cl.
*H04W 4/00* (2009.01)
(52) U.S. Cl. ........................................ 370/338; 370/315
(58) Field of Classification Search .................. 370/338, 370/315, 401
See application file for complete search history.

(56) References Cited

U.S. PATENT DOCUMENTS

| 6,243,575 | B1 | 6/2001 | Ohyama et al. |
| 6,246,883 | B1 | 6/2001 | Lee |
| 6,889,032 | B2 | 5/2005 | Dao et al. |
| 7,149,197 | B2 | 12/2006 | Garahi et al. |
| 7,167,715 | B2 | 1/2007 | Stanforth |
| 7,206,294 | B2 | 4/2007 | Garahi et al. |

(Continued)

FOREIGN PATENT DOCUMENTS

CN    11621740 A    1/2010

(Continued)

OTHER PUBLICATIONS

International Search Report and Written Opinion issued on Sep. 27, 2010 in related application PCT/US10/25267 (10 pages).

(Continued)

*Primary Examiner* — Brian D Nguyen
(74) *Attorney, Agent, or Firm* — Procopio Cory Hargreaves & Savitch LLP; Noel C. Gillespie (57) ABSTRACT

A Intelligent Mobile HotSpot (IMHS) comprises a wide area network radio interface configured to enable communications between a wide area network and the IMHS; a local area network radio interface configured to enable communications between the IMHS and a computing device; a power input configured to cause the IMHS to be powered on; memory configured to store instructions; and a processor coupled with memory, the instructions configured to cause the processor to perform the following in response to an activation of the power input: automatically establish a data connection with a base station associated with the wide area network over the wide area network, automatically establish a data connection with computing device over the local area network, and be in a ready state to route data packets from the computing device to the base station via the local area network data connection and the wide area network connection.

18 Claims, 6 Drawing Sheets

U.S. PATENT DOCUMENTS

| | | |
|---|---|---|
| 7,269,668 B2 | 9/2007 | Redford et al. |
| 7,372,843 B1 * | 5/2008 | Asawa et al. ............... 370/349 |
| 7,382,771 B2 | 6/2008 | Leblanc et al. |
| 7,408,896 B2 | 8/2008 | Chen et al. |
| 7,593,718 B2 | 9/2009 | Gorday et al. |
| 7,672,695 B1 * | 3/2010 | Rainnie et al. ............... 455/574 |
| 2002/0118663 A1 | 8/2002 | Dorenbosch et al. |
| 2003/0195010 A1 | 10/2003 | Pattabiraman et al. |
| 2004/0022222 A1 | 2/2004 | Clisham |
| 2005/0078620 A1 | 4/2005 | Balachandran et al. |
| 2005/0265323 A1 * | 12/2005 | Thermond ............... 370/356 |
| 2005/0286476 A1 | 12/2005 | Crosswy et al. |
| 2007/0073854 A1 | 3/2007 | Lindquist |
| 2007/0110017 A1 | 5/2007 | Fulknier et al. |
| 2007/0153739 A1 * | 7/2007 | Zheng ............... 370/331 |
| 2007/0206591 A1 * | 9/2007 | Doviak et al. ............... 370/389 |
| 2007/0208864 A1 | 9/2007 | Flynn et al. |
| 2007/0211686 A1 | 9/2007 | Belcea et al. |
| 2008/0117860 A1 | 5/2008 | Rodriguez et al. |
| 2009/0049176 A1 * | 2/2009 | Weinert et al. ............... 709/226 |
| 2009/0177593 A1 | 7/2009 | Natsuno et al. |
| 2010/0226280 A1 * | 9/2010 | Burns et al. ............... 370/401 |
| 2010/0228936 A1 * | 9/2010 | Wright et al. ............... 711/163 |
| 2010/0286993 A1 * | 11/2010 | Lovelace ............... 705/2 |

FOREIGN PATENT DOCUMENTS

| | | |
|---|---|---|
| JP | 2006005824 A | 1/2006 |
| WO | 2008134763 A1 | 6/2008 |
| WO | 2009106791 A1 | 3/2009 |
| WO | 2009139562 A2 | 11/2009 |

OTHER PUBLICATIONS

International Search Report and Written Opinion issued on Dec. 17, 2010 in related application PCT/US2010/034811 (9 pages).

* cited by examiner

SYSTEMS AND METHODS FOR AUTOMATIC CONNECTION WITH A WIRELESS NETWORK

RELATED APPLICATIONS INFORMATION

This application claims priority as a Continuation under 35 U.S.C. 120 to U.S. patent application Ser. No. 12/537,970 filed Aug. 7, 2009 and entitled "Systems and Methods for Automatic Connection with a Wireless Network," which in turn claims the benefit under 35 U.S.C. §119(e) of U.S. Provisional Application Ser. No. 61/178,926, filed May 15, 2009 and entitled "Rule Based Internet Browser Redirect for Wireless WAN Routers," both of which are incorporated herein by reference in its entirety as if set forth in full.

BACKGROUND

1. Technical Field

The embodiments described herein generally relate to wireless communication and more particularly to automatic connection with a wireless Wide Area Network (WAN) through a mobile, wireless Intelligent Mobile HotSpot (IMHS).

2. Related Art

Wireless modems exist that can be inserted, or otherwise interfaced with a computer and that enable data communication over a wireless Wide Area Network (WAN) such as a cellular type network. Early versions of these cards had connectors that complied with the PCMCIA standard and that were inserted into a slot in the side of the computer. Newer versions have USB connectors for interfacing with the computer. Such modems allow access to the Internet, or World Wide Web (WWW), even where no wired network connection exists and are most often interfaced with a laptop or other portable computing device.

Figures 1, 2:
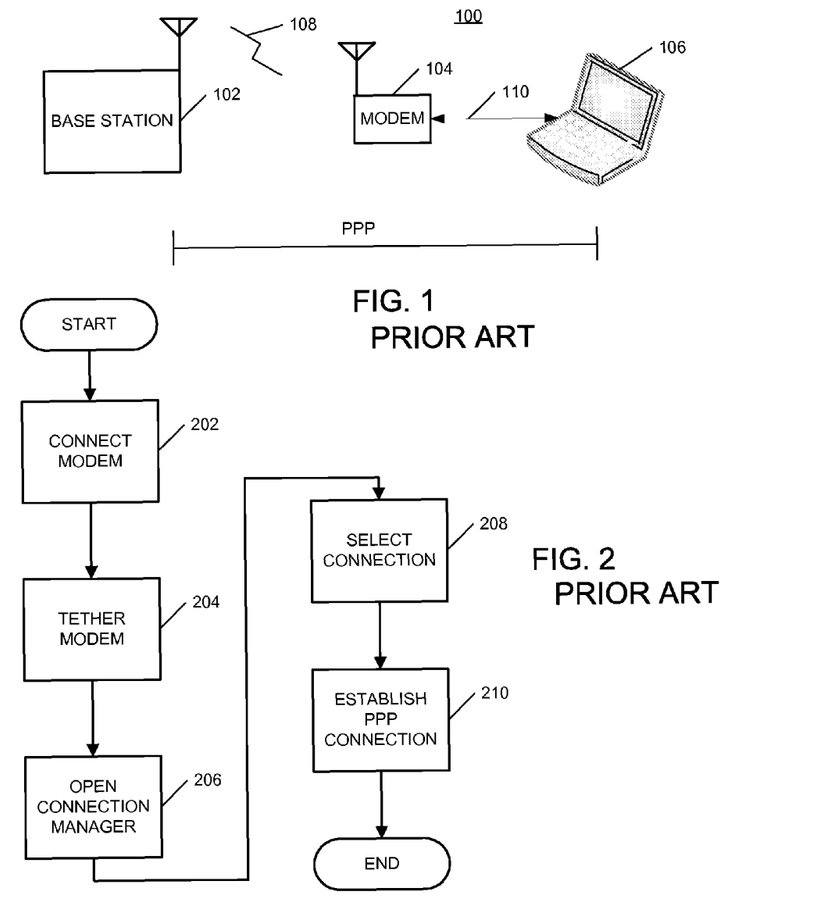
FIG. 1 is a diagram illustrating a conventional system for using a wireless modem to access a WAN.
FIG. 2 is a flow chart illustrating a conventional process for establishing a data connection using a modem included in the system of FIG. 1.

FIG. 1 illustrates a conventional system 100 in which a data connection can be established over a wide area network using a conventional wireless modem 104. In FIG. 1, modem 104 is interfaced, e.g., via a PCMCIA slot or USB connection, with a computing device 106 via connection 110. Modem 104 can then establish a data connection between base station 102, associated with, e.g., a cellular type network, and computer 106. Modem 104 and base station 102 can communicate via wireless signals 108.

FIG. 2 is a flow chart illustrating a conventional process by which such a data connection can be established. First, in step 202, a user of computing device 106 inserts, or connects modem 104 with computer 106. In step 204, modem 104 is then tethered to computing device 106. Once modem 104 is tethered to computing device 106, a connection manager running on computing device 106 can be launched in step 206. The connection manager will often display whether the network, i.e., the WAN, is available. If it is, then in step 208 the user can select the network, which will cause a Point-to-Point Protocol (PPP) connection to be established between base station 102 and computer 106 via modem 104 in step 210.

In networking, the PPP is a data link protocol commonly used to establish a direct connection between two networking nodes. It can provide connection authentication, transmission encryption privacy, and compression. PPP is used over many types of physical networks including serial cable, phone line, trunk line, cellular telephone, specialized radio links, and fiber optic links such as SONET. For example, most Internet service providers (ISPs) use PPP for customer dial-up access to the Internet. PPP is commonly used as a data link layer protocol for connection over synchronous and asynchronous circuits, where it has largely superseded the older, non-standard Serial Line Internet Protocol (SLIP) and Telephone Company mandated standards, such as Link Access Protocol, Balanced (LAPB) in the X.25 protocol suite. PPP is designed to work with numerous network layer protocols, including Internet Protocol (IP), Novell's Internetwork Packet Exchange (IPX), NBF, and AppleTalk.

One draw back to system 100 of FIG. 1 is that only a single computing device 106 can be interfaced with base station 102 via modem 104. This is because modem 104 is tethered to computing device 106.

SUMMARY

An Intelligent Mobile HotSpot (IMHS) that can interface multiple computing or wireless LAN client devices with a base station is disclosed herein.

According to one aspect, an IMHS comprises a wide area network radio interface configured to enable communications between a wide area network and the IMHS; a local area network radio interface configured to enable communications between the IMHS and a computing device; a power input configured to cause the IMHS to be powered on; memory configured to store instructions; and a processor coupled with memory, the instructions configured to cause the processor to perform the following in response to an activation of the power input: automatically establish a data connection with a base station associated with the wide area network over the wide area network, automatically establish a data connection with computing device over the local area network, and be in a ready state to route data packets from the computing device to the base station via the local area network data connection and the wide area network connection.

According to another aspect, an IMHS comprises a wide area network radio interface configured to enable communications between a wide area network and the IMHS; a local area network radio interface configured to enable communications between the IMHS and a computing device; a power input configured to cause the IMHS to be powered on; volatile memory; non-volatile memory configured to store modem instructions and a modem function table for controlling the wide area network interface and router instructions and a router function table for controlling the local area network interface, the router instructions comprising an address offset indicating an address in the volatile memory; and a processor coupled with memory, the instructions configured to cause the processor, in response to an activation of the power input, to load the modem instructions into the volatile memory, and to load the router instructions into volatile memory at the address indicated by the offset.

According to still another embodiment, A system for wireless data communication comprises a base station associated with a wide area network; and an IMHS, the IMHS comprising a wide area network radio interface configured to enable communications between the base station and the IMHS; a local area network radio interface configured to enable communications between the IMHS and a computing device; a power input configured to cause the IMHS to be powered on; memory configured to store instructions; and a processor coupled with memory The instructions can be configured to cause the processor to perform the following in response to an activation of the power input automatically establish a data connection with the base station over the wide area network automatically establish a data connection with computing device over the local area network, and be in a ready state to route data packets from the computing device to the base station via the local area network data connection and the wide area network connection.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

In the embodiments below, an IMHS is used to interface a plurality of computing device or LAN client devices with a wireless WAN. For example, the WAN can be configured to implement one of the Third Generation (3G) protocols, such as EDGE, CDMA2000, or the Universal Mobile Telecommunications System (UMTS) protocols, High Speed Packet Access (HSPA) or HSPA+ protocols, Long Term Evolution (LTE) protocols, Evolution Data Optimization (EV-DO) rev. A (DOrA), WiMAX, or other newer 4G protocols. The computing devices interface with the IMHS over a wireless Local Area Network (LAN) such as a WiFi network, wireless USB network, ultrawideband network, or a Zigbee network; however, it will be understood that the descriptions that follow are not intended to limit the embodiments herein to particular standards or architectures, the embodiments being provide by way of example only.

Figure 3:
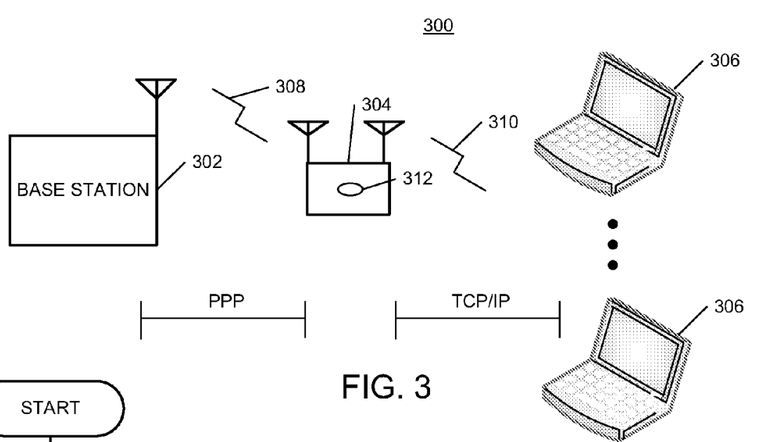
FIG. 3 is a diagram illustrating an example system for using an IMHS to access a WAN in accordance with one embodiment.

FIG. 3 is a diagram illustrating an example system 300 for using an IMHS to access a WAN in accordance with one embodiment. Central to system 300 is IMHS 304. While not illustrated in detail in FIG. 3, IMHS 304 can comprise two radio communication interfaces: one for communicating with a base station 302 associated with a WAN, and one for communicating with a plurality of computing or wireless LAN client devices 306 via a wireless LAN. Thus, IMHS 304 can communicate with base station 302 via wireless signals 208 and with devices 306 via wireless signals 310, where signals 308 and 310 implement different protocols associated with the related network.

Figure 4:
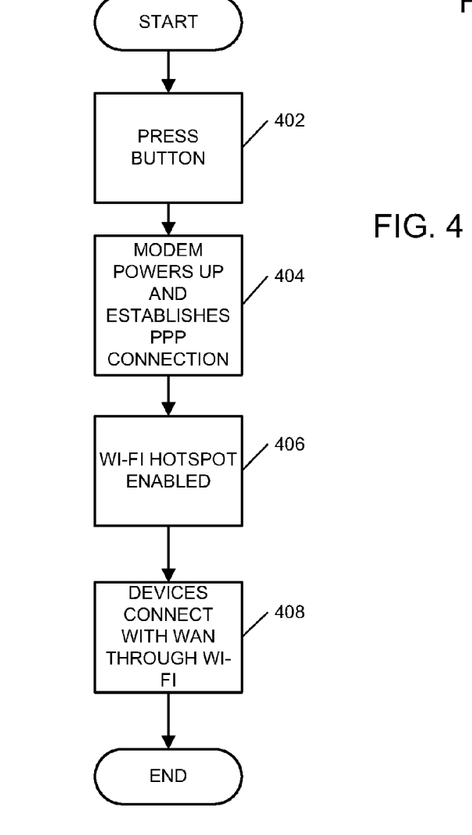
FIG. 4 is a flow chart illustrating an example process for establishing a data connection using an IMHS included in the system of FIG. 3 in accordance with one embodiment.

In certain embodiments, IMHS 304 can, e.g., be configured to interface as many as five (5) computing devices 306 with base station 302. FIG. 4 is a flow chart illustrating an example process by which devices 306 can be interfaced with base station 302. As can be seen in FIG. 3, IMHS 304 can comprise a single power button, or switch 312, when a user presses button 312 to power on IMHS 304, in step 402, then IMHS 304 will power up and automatically establish a data connection, e.g., a PPP connection, with base station 302 in step 404. As illustrated, this PPP connection is between base station 302 and IMHS 304 and not between base station 302 and devices 306. In step 406, IMHS 304 will then enable the LAN. In step 408, devices 306 can automatically connect to the WAN through IMHS 304 and the LAN connections 310. In other words, IMHS 304 can act as a wireless LAN access point for devices 306. Communication between IMHS 304 and devices 306 can be via TCP/IP over WiFi. In certain embodiments, the users of devices 306 must provide a password when accessing the LAN. The password can be printed on device 304 or displayed on device 304.

Thus, all that is required to enable multiple computing devices 306 to access the wireless WAN is to power on IMHS 304, and possibly provide a password. IMHS 304 will automatically establish a connection with the WAN and enable the wireless LAN hotspot in response. There is no tethering of IMHS 304 with devices 306.

Figure 5:
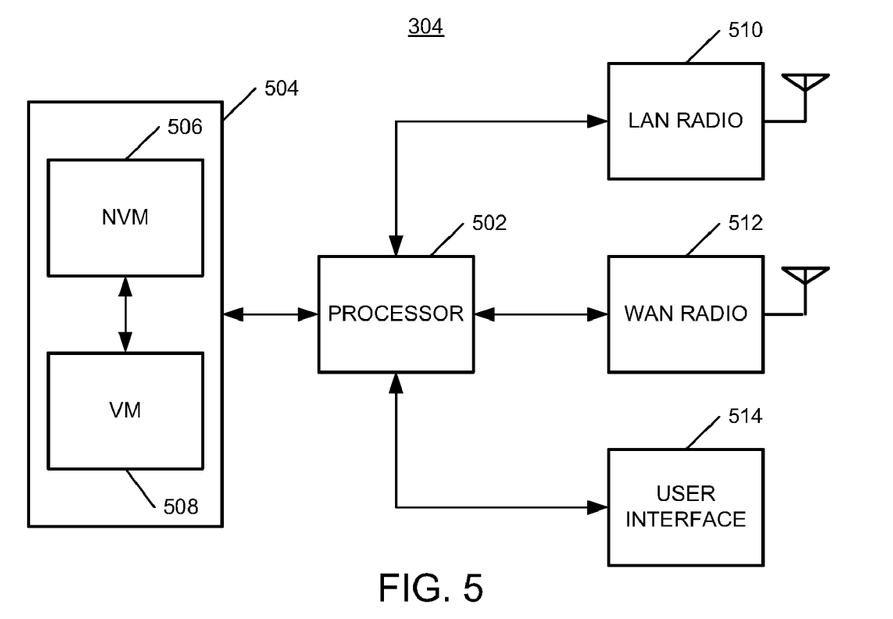
FIG. 5 is a diagram illustrating example components that can be included in an IMHS included in the system of FIG. 3 in accordance with one embodiment.

FIG. 5 is a diagram illustrating certain components that can be included in IMHS 304 in accordance with one embodiment. It will be understood that additional components can be included in IMHS 304. The example of FIG. 5 is not intended to exhaustively show all components, but rather is provided by way of example to illustrate certain components in relation to the systems and methods described herein. As such, the example of FIG. 5 should not be seen as limiting the systems and methods described herein to a certain design or architecture. Moreover, the components illustrated in FIG. 5 are obviously depicted at a high level. It will be understood that the components can actually be implemented via multiple components such as multiple integrated circuits, discrete device, or both, and can be packaged in a single package or in multiple packages. It will also be understood that IMHS 304 is often battery powered and therefore will comprise a battery (not shown).

Referring to FIG. 5, IMHS 304 can comprise a processor 502 interfaced with memory 504, LAN radio 510, WAN radio 512, and user interface 514. Processor 502 will often comprise several processing cores such as a digital signal processing core, a microprocessing core, math-coprocessors, etc.

Memory 504 can comprise several forms of memory, such as non-volatile memory 506 and volatile memory 508. Non-volatile memory is used to store data and instructions that should be maintained even when power is removed from IMHS 304. Volatile memory is used to store instructions and data for which it is not important whether it is maintain when power is removed. For example, the code used to run IMHS 304 can be stored in non-volatile memory 506 such that it is maintained even when IMHS 304 is turned off and so that IMHS 304 can access this code when it is turned on again; however, the code can be copied to volatile memory 508 when IMHS 304 is on. This can, for example, allow faster access to instructions and data by processor 502.

Examples of non-volatile memory include Read-Only Memory (ROM), flash memory, and most types of magnetic computer storage devices, e.g., hard disks, floppy disks, and magnetic tape and optical discs, although these later devices are not generally used for IMHS 304. Rather, the former, which can be referred to as electrically addressed non-volatile memories are typically used for IMHS 304. Non-volatile memory is typically used for the task of secondary storage, or long-term persistent storage. Most forms of non-volatile memory have limitations that make them unsuitable for use as primary storage. Typically, non-volatile memory either costs more or performs worse than volatile random access memory. Electrically addressed non-volatile memories can include a Programmable ROM (PROM), Erasable PROMs (EPROM), Electrically erasable PROM (EEPROM), Flash memory, or some combination thereof.

Volatile memory, also known as volatile storage or primary storage device, is computer memory that requires power to maintain the stored information, unlike non-volatile memory which does not require a maintained power supply. The most widely used form of primary storage today is a volatile form of random access memory (RAM), meaning that when the computer is shut down, anything contained in RAM is lost. Most forms of modern RAM are volatile storage, including Dynamic Random Access Memory (DRAM) and static random access memory (SRAM). Thus, IMHS 304 can include DRAM, SRAM, or some combination thereof, although IMHS 304 is more likely to include SRAM than DRAM.

In certain embodiments, some portion or even all of non-volatile memory 506, volatile memory 508, or both can be included with processor 502.

LAN radio 510 can comprises all of the hardware required for the radio front end of the wireless LAN interface. Similarly, WAN radio 512 can comprises all of the hardware required for the radio front end of the wireless WAN interface. Processor 502 or components thereof can serve as the processing backend for both radios 510 and 512. Alternatively, separate processing circuitry can be included for each of the LAN function and the WAN function. In such embodiments, the processing functionality described herein can be included in either the LAN processing circuitry or the WAN processing circuitry.

User interface 514 can comprise just button 312. But in other embodiments, it can also comprise a display, e.g., to display a password.

Instructions stored in memory 504 can be used by processor 502 to control the operation of IMHS 502 including control of radios 510 and 512. Thus, the instructions stored in memory 504 should include instructions for controlling the operation of radios 510 and 512 as well as for bridging communications between basestation 320 and devices 306 and for configuring IMHS 304. In certain embodiments, the instructions for controlling WAN radio 512, and the authentication procedures for connecting to the WAN, can be included in standard code associated with WAN radio 512. These instructions can be referred to as modem instructions. Separate instructions for controlling the remaining functions of IMHS 304 can then also be stored in memory 504, including the procedures and settings for controlling LAN radio 510. These instructions can be referred to as router instructions.

Figure 6:
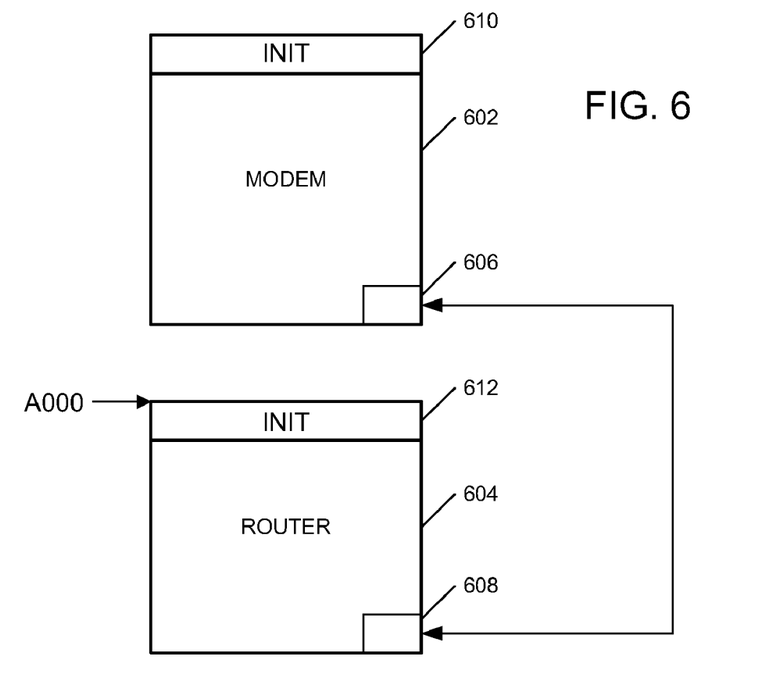
FIG. 6 is a diagram illustrating modem and router instructions that can be loaded into volatile memory in the IMHS of FIG. 5 in accordance with one embodiment.

FIG. 6 is a diagram illustrating examples blocks of instructions that can be stored in memory 504. For example, the instructions can be stored in non-volatile memory 506 and can, e.g., be copied to volatile memory 508 during operation. As can be seen, the instructions illustrated in FIG. 6 can comprise modem instructions 602 and router instructions 604. Each set of instructions can comprise an initialization routine 610 and 612 respectively, and be associated with a function table 606 and 608 respectively. Router instructions 604 can also be associated with an offset or known address, e.g., A000, at which it should be loaded into volatile memory.

A process for allowing these two sets of instructions to interact must then be implemented in such embodiments.

Figure 7:
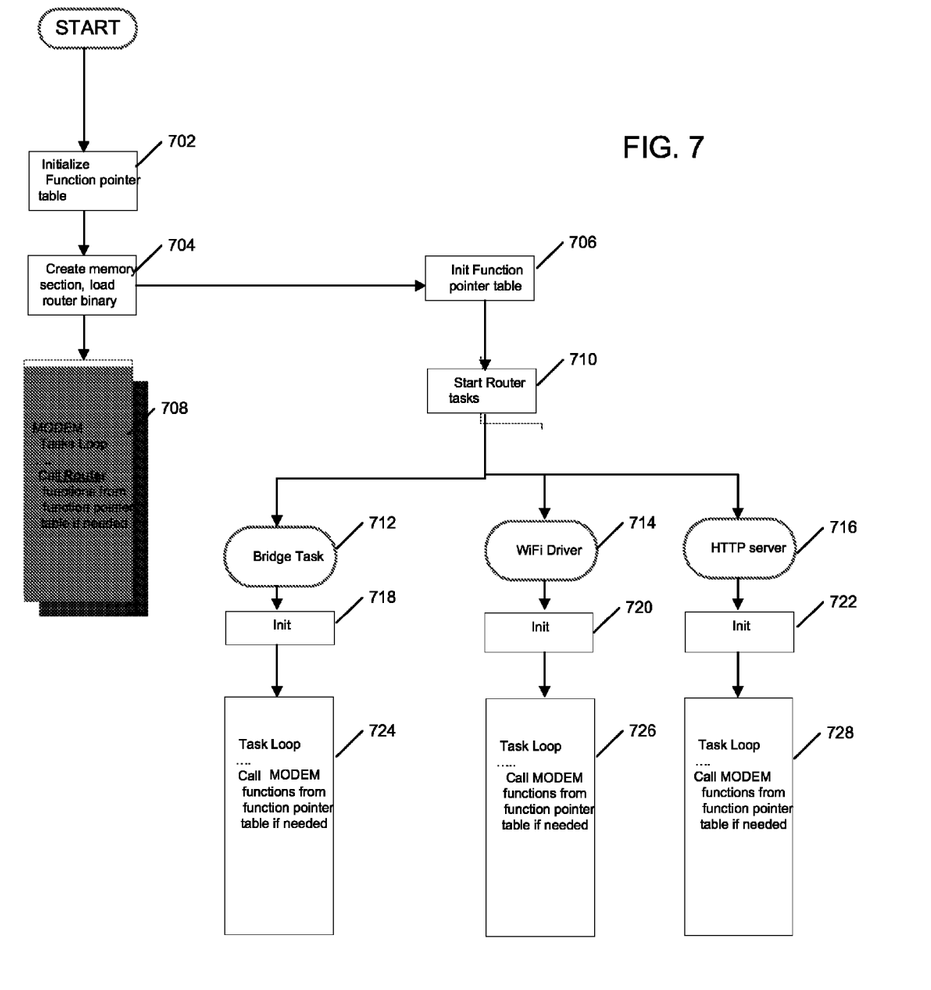
FIG. 7 is a diagram illustrating an example method for loading and initializing the modem and router instructions of FIG. 6 in accordance with one embodiment.

FIG. 7 is a flow chart illustrating an example process for loading modem instructions and router instructions into volatile memory 508 for execution by processor 502 and for configuring the instructions to interact with each other. In step 702, on boot up, e.g., activation of button 312, modem initialization function 610 can generate a modem function pointer table 606, which can be populated with modem functions. In step 704, a block of memory can be reserved in volatile memory 508, e.g., at the known offset address, and router instructions 604 can be loaded into the reserved block in nonvolatile memory 508. Router initialize function 612 can then be called in step 706. Initialization function 612 in the router instructions 604 can then populate function table 608 with router functions. Modem instructions 602 will need to use, or call certain functions included in router instructions 604. Similarly, router instructions 604 will need to call certain functions in modem instructions 602. Accordingly, the initialization functions can cause each set of instructions to exchange pointers to the relevant functions, such that modem function table 606 will include pointers to the relevant functions in router instructions 604 and router function table 608 will include pointers to the relevant functions in modem instructions 602.

Alternatively, a single function table with the appropriate functions and pointers can be created and used by both modem and router instructions 602 and 604; however, it will be understood that how the function tables are described is a matter of convenience and that what is important is that there is an association between functions and pointers to functions in the various instructions that is maintained within IMHS 304.

Initialization function 612 can also be configured to create a set of related tasks, e.g., an http server task, a WiFi driver task, a bridge task, etc. For example, once the functional tables are initializes, the router instructions can start to run in step 708. Different tasks can then be called in steps 712, 714, and 716, which can cause initialization functions related with each tasks to run in steps 718, 720, and 722. These initialization functions can then initialize the related tasks such that they can run in steps 724, 726 and 728.

On successful initialization, router instructions 604 can be configured to notify modem instructions 602 through either a return value or a signal.

Modem instructions 602 can start to run in step 708. As the modem instruction and router tasks run, they can communicate with each other using the set of function pointers populated in the function pointer tables. For example, a typical function that a router task can use is "efs_open" or "rex_sleep." Modem instructions 602 can, for example, call a transmit function in the router WiFi driver or it can call the address translate functions.

Figure 8:
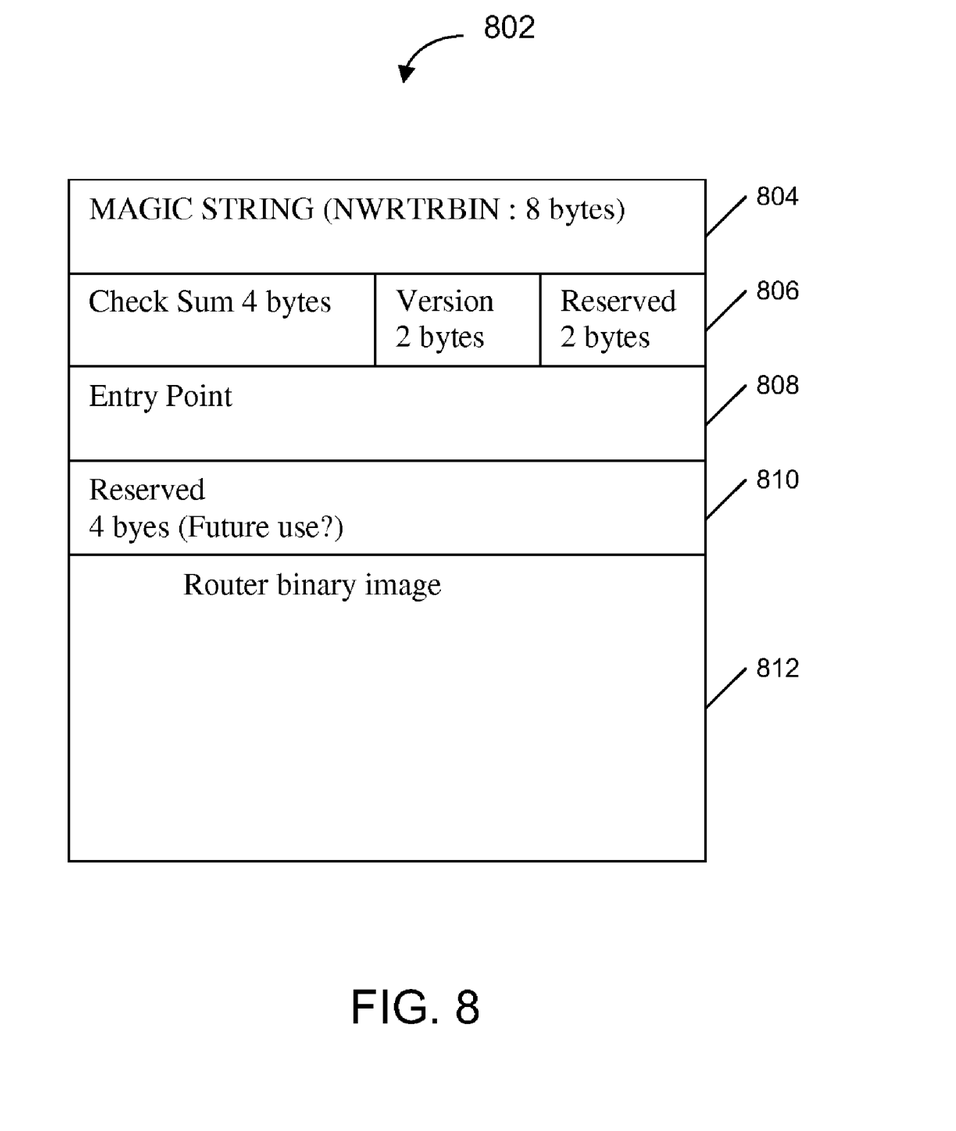
FIG. 8 is a diagram illustrating an example image of the router instructions of FIG. 6 in accordance with one embodiment.

A partition table for memory 504 can for example have one additional, e.g., 3 MB partition for router instructions 604. Router instructions 604 can be built into a binary file from, e.g., an elf file. FIG. 8 is a diagram illustrating an example image 802 of router instructions 604 in accordance with one embodiment. A header can be added to the binary and can include a signature field 804, for the image signature; a checksum field 806, which can, e.g., comprise a 4 byte checksum and a 2 byte version, as well as 2 reserved bytes; and entry point field 808 to hold the address offset; and a 4 byte reserved field 810. Image 802 can then mostly consist of the binary image 812 for instructions 604.

On boot up, the operating system can verify the checksum, version compatibility, and magic string from the image header before proceeding to the next step, e.g., step 702.

Accordingly, router instructions 604 are not statically linked into modem instructions 602. Rather, they will be compiled and linked into a separate binary with a fixed entry point (offset address) specified in the router image header. This binary can then be loaded at that exact location specified by the offset address at run time. The memory location specified by the offset address should specify a block of memory that is not used by the memory instructions. Once the memory section is created, the router binary except the header can then be loaded at the address where the image was created. After the modem instruction initialization is completed, it will call an initialization function located in the router binary. This location will be known to the modem instructions because where the router binary was loaded in the memory will be known. The router initialization function can then populate the rest of the function pointers in the structure described above for the modem instructions. Form this point on the modem and router instructions can communicate with each other using the set of functions that have been saved in the function pointer table.

Once IMHS 304 is powered up, the connection with base station 302 is establish, the LAN is activated, and IMHS 304 will be ready to route data packets from devices 306 to base station 302. Devices 306 can then access, e.g., the Internet through IMHS 304. All that may be required for devices 306 to access the Internet, or more generally the WAN associated with base station 302 is a password, which can be displayed in IMHS 304. Contrast this with system 100 in which only a single device 106 can access the WAN.

Figure 9A:
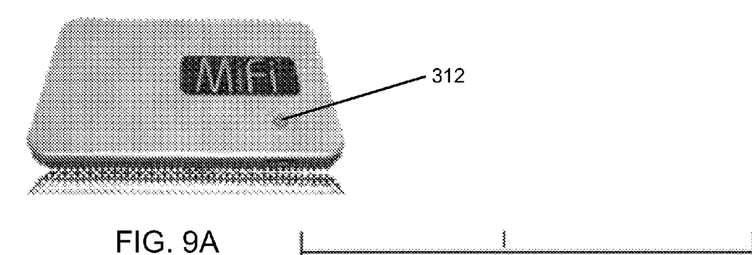
FIGS. 9A-D are diagrams illustrating various example implementations of an IMHS.
Figure 9B:
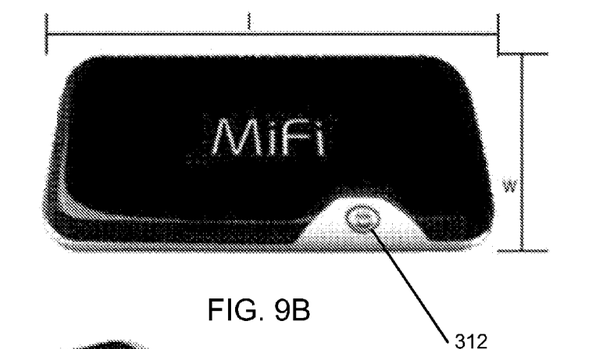
Figures 9C, 9D:
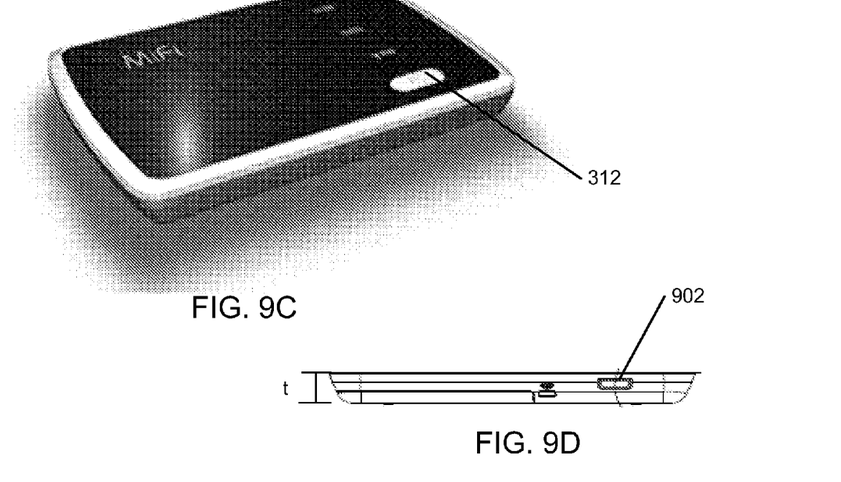

FIGS. 9A-D are diagrams illustrating various example implementations of IMHS 304. As can be seen, each implementation includes a single button 312. Additionally, as illustrated in FIG. 9D, IMHS 304 can include a USB or other data connection 902 for interfacing with IMHS 304. In certain embodiments, IMHS 304 can be approximately credit card sized. In other words, IMHS 304 can comprise a length (l) and width (w) that are very close to those of a credit card. In addition, IMHS 304 can comprise a thickness that is very thin. While it may be thicker than a credit card, the overall dimensions can be such that IMHS can easily fit in a pocket or even a wallet.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A Mobile HotSpot, comprising:
 a wide area network radio interface configured to enable communications between a wide area network and the Mobile HotSpot;
 a local area network radio interface configured to enable communications between the Mobile HotSpot and a computing device;
 a power button configured to cause the Mobile HotSpot to be powered on;
 volatile memory;
 non-volatile memory configured to store modem instructions and a modem function table for controlling the wide area network interface and router instructions and a router function table for controlling the local area network interface, the router instructions comprising an address offset indicating an address in the volatile memory; and
 a processor coupled with the volatile and non-volatile memory, the non-volatile memory having default instructions configured to cause the processor, in response to an activation of the power button, to load the modem instructions into the volatile memory, and to load the router instructions into the volatile memory at the address indicated by the offset, the modem and router instructions configured to cause the processor to perform the following also in response to an activation of the power button:
  automatically establish a data connection with a base station associated with the wide area network over the wide area network,
  automatically establish a data connection with client device over the local area network, and
  be in a ready state to route data packets from the client device to the base station via the local area network data connection and the wide area network connection.

2. The Mobile HotSpot of claim 1, wherein the wide area network is a cellular network.

3. The Mobile HotSpot of claim 1, wherein the local area network is a WiFi network.

4. The Mobile HotSpot of claim 1, wherein the local area network is a wireless USB network or an Ultarwideband network, or a Zigbee network.

5. The Mobile HotSpot of claim 1, wherein the wide area data connection is a Point-to-Point (PPP) connection.

6. The Mobile HotSpot of claim 1, wherein the local area network data connection is a TCP/IP connection.

7. The Mobile HotSpot of claim 1, wherein the volatile memory, non-volatile memory, or both are further configured to store authentication procedures required to connect to the wide area network and settings for the local area network, and wherein the processor is further configured to use the authentication procedures and settings to automatically establish a data connection with a base station associated with the wide area network over the wide area network, and automatically establish a data connection with client device over the local area network, in response to the activation of the power button.

8. The Mobile HotSpot of claim 7, wherein the authentication procedures and settings are updated via the wide area network.

9. The Mobile HotSpot of claim 1, wherein the modem instructions include a modem initialization routine and the router instructions include a router initialization routine, and wherein the modem initialization routine and the router initialization routine are configured to cause the processor to associate pointers with certain functions in the modem function table that point to functions in the router function table and to associate pointers with certain functions in the router function table that point to functions in the modem function table.

10. The Mobile HotSpot of claim 1, wherein the processor is further configured to automatically establish a data connection with a plurality of computing devices over the local area network, and route data requests from the plurality of computing device to the base station via the local area network data connection and the wide area network connection, in response to the activation of the power button.

11. The Mobile HotSpot of claim 1, further comprising a battery configured to supply power to the Mobile HotSpot.

12. The Mobile HotSpot of claim 11, wherein the Mobile HotSpot is about credit card sized.

13. The Mobile HotSpot of claim 1, wherein the wide area network radio interface comprises a radio front end and processor circuitry, and wherein the processor resides within the processor circuitry.

14. The Mobile HotSpot of claim 1, wherein the local area network radio interface comprises a radio front end and processor circuitry, and wherein the processor resides within the processor circuitry.

15. An Mobile HotSpot, comprising:
- a wide area network radio interface configured to enable communications between a wide area network and the Mobile HotSpot;
- a local area network radio interface configured to enable communications between the Mobile HotSpot and a computing device;
- a power button configured to cause the Mobile HotSpot to be powered on;
- volatile memory;
- non-volatile memory configured to store modem instructions and a modem function table for controlling the wide area network interface and router instructions and a router function table for controlling the local area network interface, the router instructions comprising an address offset indicating an address in the volatile memory; and
- a processor coupled with the volatile and non-volatile memory, the non-volatile memory having default instructions configured to cause the processor, in response to an activation of the power button, to load the modem instructions into the volatile memory, and to load the router instructions into the volatile memory at the address indicated by the offset.

16. The Mobile HotSpot of claim 15, wherein the modem instructions include a modem initialization routine and the router instructions include a router initialization routine, and wherein the modem initialization routine and the router initialization routine are configured to cause the processor to associate pointers with certain functions in the modem function table that point to functions in the router function table and to associate pointers with certain functions in the router function table that point to functions in the modem function table.

17. The Mobile HotSpot of claim 15, wherein the modem instructions and the router instructions are further configured to cause the processor to perform the following in response to an activation of the power button:
- automatically establish a data connection with a base station associated with the wide area network over the wide area network,
- automatically establish a data connection with a computing device over the local area network, and
- be in a ready state to route data packets from the computing device to the base station via the local area network data connection and the wide area network connection.

18. The Mobile HotSpot of claim 17, wherein the wide area network is a cellular type network, and wherein the local area network is a WiFi network.

* * * * *